(12) United States Patent
Maurer et al.

(10) Patent No.: US 8,747,136 B2
(45) Date of Patent: Jun. 10, 2014

(54) CONTACT-MAKING APPARATUS HAVING A CHARGING CONTACT ELEMENT ROTATABLE BY A DRIVE MOTOR

(75) Inventors: Steffen Maurer, Stuttgart (DE); Edmund Sander, Leonburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 49 days.

(21) Appl. No.: 13/543,955

(22) Filed: Jul. 9, 2012

(65) Prior Publication Data
US 2013/0012044 A1  Jan. 10, 2013

(30) Foreign Application Priority Data
Jul. 7, 2011 (DE) .......................... 10 2011 051 646

(51) Int. Cl.
*H01R 13/64* (2006.01)
(52) U.S. Cl.
USPC ....................................................... 439/246
(58) Field of Classification Search
USPC ........ 439/246, 324, 476.1; 180/65.1; 191/147
See application file for complete search history.

(56) References Cited

U.S. PATENT DOCUMENTS

| | | | |
|---|---|---|---|
| 3,458,851 A | 7/1969 | Webb | |
| 2011/0259656 A1* | 10/2011 | Lacour | 180/65.1 |
| 2012/0206098 A1* | 8/2012 | Kim | 320/108 |
| 2013/0012054 A1* | 1/2013 | Andresen et al. | 439/476.1 |
| 2013/0023141 A1* | 1/2013 | Meyer-Ebeling | 439/324 |
| 2013/0093389 A1* | 4/2013 | Partovi | 320/108 |

FOREIGN PATENT DOCUMENTS

| | | |
|---|---|---|
| DE | 28 15 330 | 10/1979 |
| DE | 33 32 187 | 4/1985 |
| JP | 11-219747 | 8/1999 |

* cited by examiner

*Primary Examiner* — Chandrika Prasad
(74) *Attorney, Agent, or Firm* — Gerald E. Hespos; Michael J. Porco; Matthew T. Hespos

(57) ABSTRACT

A contact-making apparatus is provided for producing a low-voltage connection between a motor vehicle (1) and a charging apparatus. The contact-making apparatus has at least one motor vehicle contact element (11, 12) associated with the motor vehicle, and with at least one charging contact element (15, 16) associated with the charging apparatus. To simplify the production of a low-voltage connection between a motor vehicle and a charging apparatus, the charging contact element (15, 16) has a charging contact face (17, 18) that can fit on the charging apparatus movably relative to a motor vehicle contact face and has a configuration matched to the configuration of the motor vehicle contact face on the motor vehicle contact element (11, 12).

9 Claims, 2 Drawing Sheets

CONTACT-MAKING APPARATUS HAVING A CHARGING CONTACT ELEMENT ROTATABLE BY A DRIVE MOTOR

CROSS REFERENCE TO RELATED APPLICATION

This application claims priority under 35 USC 119 to German Patent Appl. No. 10 2011 051 646.8 filed on Jul. 7, 2011, the entire disclosure of which is incorporated herein by reference.

BACKGROUND OF THE INVENTION

1. Field of the Invention

The invention relates to a contact-making apparatus for producing a low-voltage connection between a motor vehicle and a charging apparatus. The contact-making apparatus has at least one motor vehicle contact element associated with the motor vehicle, and at least one charging contact element associated with the charging apparatus. The invention also relates to a motor vehicle with such a contact-making apparatus and to a method for charging an electrical energy storage device of a motor vehicle.

2. Description of the Related Art

JP 11219747 A discloses a contact-making apparatus for a motor vehicle with a plug-type connection element that is fit to a door of the motor vehicle. DE 28 15 330 A1, DE 33 32 187 A1 and U.S. Pat. No. 3,458,851 disclose contact elements with a self-cleaning effect for measurement and test purposes.

The object of the invention is to simplify the production of a low-voltage connection between a motor vehicle and a charging apparatus.

SUMMARY OF THE INVENTION

The invention relates to a contact-making apparatus for producing a low-voltage connection between a motor vehicle and a charging apparatus. The contact making apparatus has at least one motor vehicle contact element associated with the motor vehicle, and with at least one charging contact element associated with the charging apparatus. The charging contact element has a charging contact face fit on the charging apparatus movably relative to a motor vehicle contact face. The charging contact element has a configuration that is matched to the configuration of the motor vehicle contact face on the motor vehicle contact element. The two contact faces are brought into contact with one another to produce the low-voltage connection between the motor vehicle and the charging apparatus. This has the advantage that no plug-type connection is required, as is known, for example, from JP 11219747 A. The use of the contact faces makes it possible for the charging operation to be automated in a simple manner. The low voltage is, for example, a 220 volt AC voltage or a 380 volt three-phase current voltage. The contact faces are preferably movable together with the contact elements altogether with parts or regions of the contact elements.

The charging contact face of the contact-making apparatus and the motor vehicle contact face may be flat.

Alternatively, the charging contact face may taper conically and the motor vehicle contact face also preferably is conical so as to be complementary to the charging contact face.

The charging contact face of the contact-making apparatus may be fit to the charging apparatus so as to be movable in oscillating fashion. The charging contact face can be set into oscillatory motion relative to the motor vehicle contact face, preferably with the charging contact element or a part or a region of the charging contact element.

The charging contact face of the contact-making apparatus preferably is fit rotatably to the charging apparatus. The charging contact face can be set into rotary motion relative to the motor vehicle contact face, preferably with the charging contact element or a part or region of the charging contact element.

The charging apparatus preferably comprises at least one drive motor for setting the charging contact face in motion. The drive motor preferably is fit together with the contact element on a mount. The drive motor can set charging contact face in motion together with the charging contact element or with a part or region of the charging contact element.

The motor vehicle contact face of the contact-making apparatus preferably is fit to a lower side of the motor vehicle, in particular to a battery, and the charging contact face preferably is fit to an upper side of the charging apparatus. The two contact faces face one another and preferably are freely accessible. As a result, the process of bringing the two contact faces into contact with one another is simplified considerably and thus is automatable.

The charging apparatus of the contact-making apparatus preferably is connectable to a fixed power supply system. The charging apparatus can be mobile or stationary. The charging apparatus can be combined with a charging station or can be connected to the charging station as a separate apparatus via a connecting channel.

The invention also relates to a motor vehicle, in particular an electric vehicle or a hybrid vehicle, with a motor vehicle contact element that can be connected to a charging contact element with the aid of the above-described contact-making apparatus. The contact-making apparatus preferably comprises a mount, on which at least one charging contact element is fit. Preferably, two charging contact elements are fit to the mount. Preferably, a drive motor is associated with each charging contact element. The contact-making apparatus is particularly advantageously in the form of a car jack.

The invention also relates to a method for charging an electrical energy storage device of a previously described motor vehicle with the aid of the above-described contact-making apparatus. To produce the low-voltage connection, the contact-making apparatus is arranged beneath the motor vehicle. The charging contact elements then are raised alone or together with at least one part of the contact-making apparatus so that the charging contact faces come into contact with the motor vehicle contact faces on the lower side of the motor vehicle. Thereupon, the charging contact faces or the charging contact elements are set in motion, while they are in contact with the motor vehicle contact elements.

Further advantages, features and details of the invention can be gleaned from the description below, in which various exemplary embodiments are described in detail with reference to the drawing.

DETAILED DESCRIPTION OF THE PREFERRED EMBODIMENTS

Figure 1:
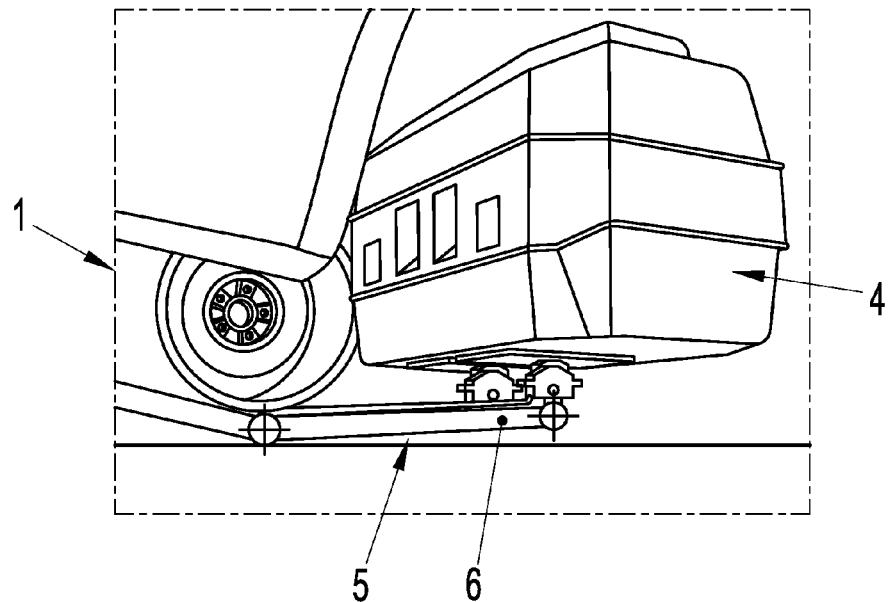
FIG. 1 is a perspective illustration of an electrical energy storage device of a motor vehicle with a contact-making apparatus according to the invention.

FIG. 1 illustrates a detail of a motor vehicle 1 with an electrical energy storage device 4 in a perspective view. A contact-making apparatus 5 is arranged beneath the motor vehicle 1. The contact-making apparatus 5 comprises a mount 6 that is movable up towards the electrical energy storage device 4 in the manner of a car jack.

The electrical energy storage device 4 is a high-voltage battery or traction battery of an electric vehicle or hybrid vehicle. The contact-making apparatus 5 can access a lower side of the electrical energy storage device 4 from below to connect a charging apparatus to the electrical energy storage device 4. The charging apparatus can charge the electrical energy storage device via a low-voltage connection.

Figure 2:
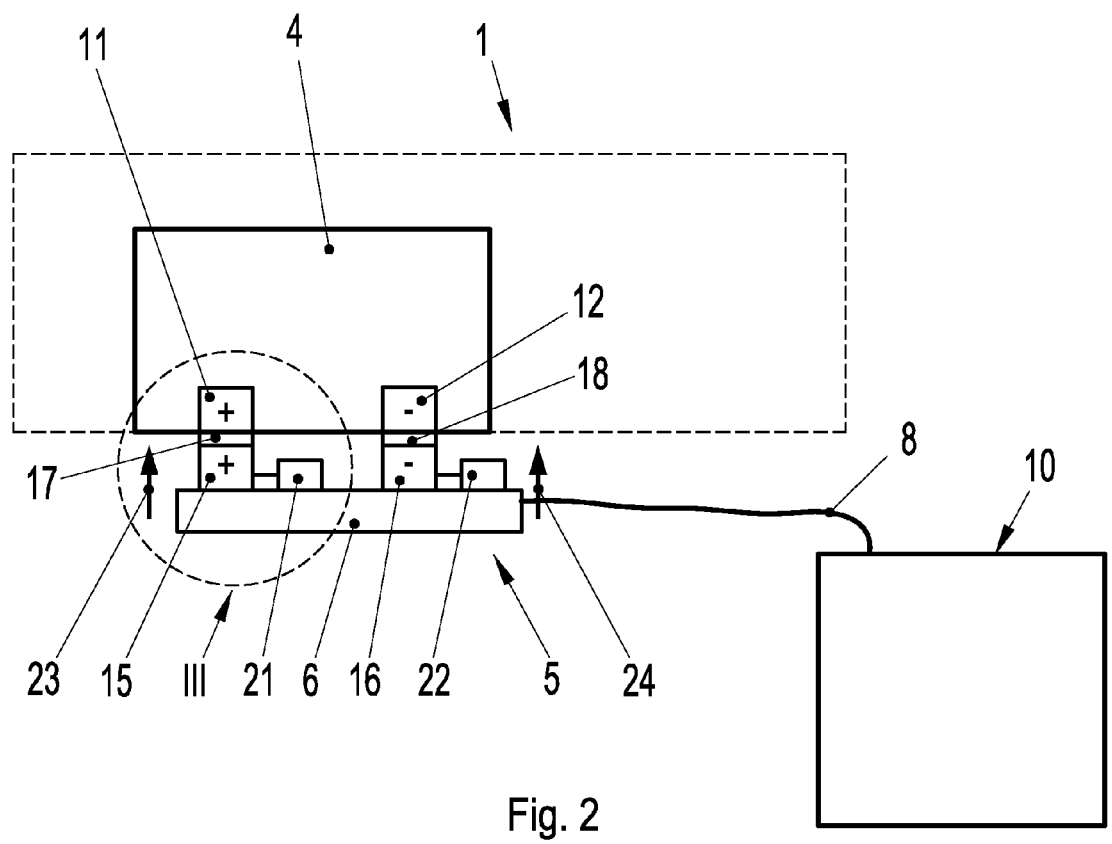
FIG. 2 is a schematic illustration of the motor vehicle with the contact-making apparatus shown in FIG. 1.

FIG. 2 is a simplified schematic view of the motor vehicle 1 with the electrical energy storage device 4 and the contact-making apparatus 5 shown in FIG. 1. The charging apparatus comprises the contact-making apparatus 5 and a charging station 10. The contact-making apparatus 5 is connected to the charging station 10 with the aid of a connecting cable 8. The charging station 10 in turn is connected to a fixed power supply system.

The electrical energy storage device 4 comprises a positive motor vehicle contact element 11 and a negative motor vehicle contact element 12. A positive charging contact element 15 and a negative charging contact element 16 are fit to the mount 6 of the contact-making apparatus 5. The charging contact elements 15, 16 comprise flat charging contact faces 17, 18 that face a likewise flat motor vehicle contact face.

Arrows 23, 24 indicate that the mount 6 is capable of moving with the charging contact elements 15, 16 towards the motor vehicle contact elements 11, 12 to bring the charging contact elements 15, 16 into contact with the motor vehicle contact elements 11, 12. The movement of the mount 6 in the direction of the arrows 23, 24 is effected by virtue of the fact that the contact-making apparatus 5 is raised with the mount 6 in the manner of a car jack.

Two drive motors 21, 22 are arranged on the mount 6. The drive motors 21, 22 enable the charging contact elements 15, 16 with the charging contact faces 17, 18 to be set in motion relative to the motor vehicle contact elements 11, 12, while the charging contact elements 15, 16 with the charging contact faces 17, 18 are in contact with the motor vehicle contact elements 11, 12.

The movement of the charging contact faces 17, 18 or the charging contact elements 15, 16 is provided either only at the beginning of a charging operation to clean the contact faces or, as an alternative or in addition, the movement can be exerted during the charging operation to reduce contact resistance in the current flow during charging of the electrical energy storage device 4.

Figure 3:
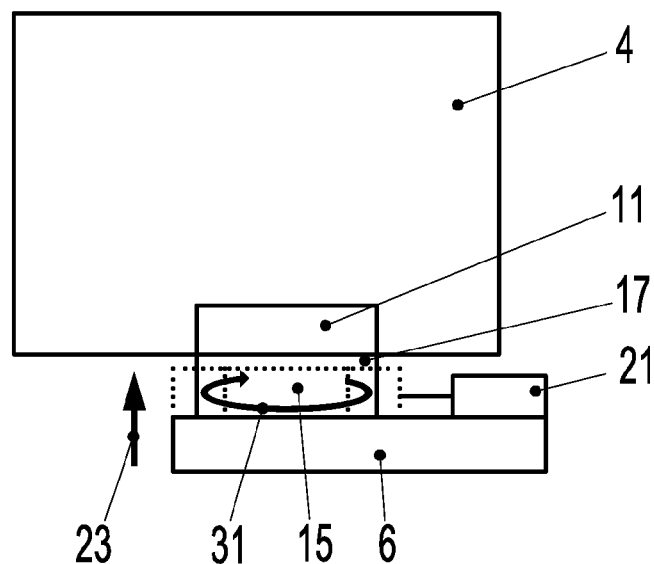
FIG. 3 is an enlarged view of a detail III from FIG. 2.

FIG. 3 shows an enlarged illustration of a detail III from FIG. 2. In the enlarged illustration, an arrow 31 indicates that the flat charging contact face 17 of the charging contact element 15 is set into oscillating motion with the aid of the drive motor 21. The charging contact face 17 and the motor vehicle contact face on the motor vehicle contact element 11 have the configurations of a rectangle or a circular area.

Figure 4:
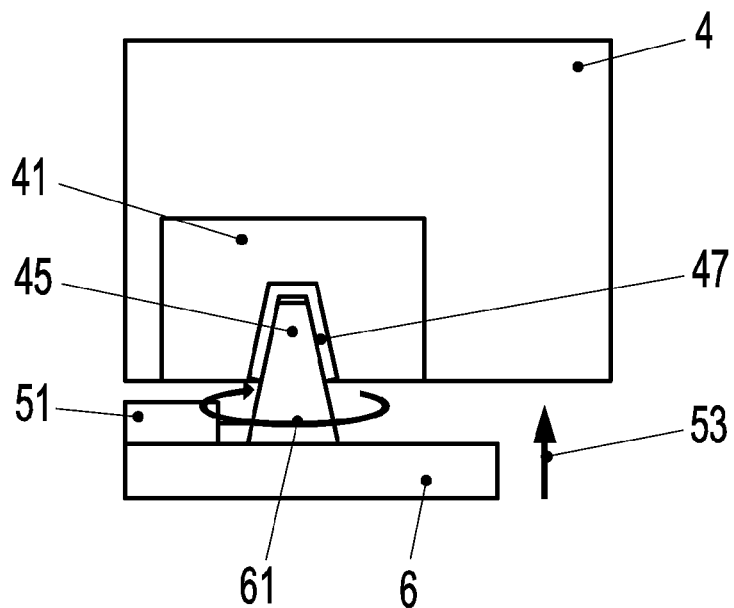
FIG. 4 is a similar illustration to that shown in FIG. 3 in accordance with a further exemplary embodiment.

FIG. 4 is similar to FIG. 3, but shows a further embodiment with a conical motor vehicle contact element 41 and a conical charging contact element 45. The motor vehicle contact element 41 has a conical depression, in which a complementarily designed conical projection is arranged. The projection is formed on the charging contact element 45.

A charging contact face 47 is formed on the conical projection of the charging contact element 45 and tapers conically away from the mount 6. An arrow 53 indicates that the mount 6 is moved toward the electrical energy storage device 4 in such a way that the charging contact element 45 is inserted into the motor vehicle contact element 41 to produce the low-voltage connection.

When the charging contact face 47 of the charging contact element 45 is in contact with the motor vehicle contact face of the motor vehicle contact element 41, the charging contact face 47 with the charging contact element 45 can be set in rotary motion by a drive motor 51, with this rotary motion being indicated by an arrow 61.

What is claimed is:

1. A contact-making apparatus for producing a low-voltage connection between a motor vehicle and a charging apparatus, the apparatus comprising:
    at least one motor vehicle contact element associated with the motor vehicle, the at least one motor vehicle contact element having a motor vehicle contact face;
    at least one charging contact element mounted rotatably on the charging apparatus, the charging contact element having a charging contact face configured for surface-to-surface contact with the motor vehicle contact face; and
    at least one drive motor on the charging apparatus and coupled to the at least one charging contact element, the drive motor being configured for rotating the charging contact element while the charging contact face maintains contact with the motor vehicle contact face, whereby rotation of the charging contact element relative to the motor vehicle contact element cleans the motor vehicle contact face and the charging contact face to enhance electrical connection therebetween.

2. The contact-making apparatus of claim 1, wherein the charging contact face is flat.

3. The contact-making apparatus of claim 1, wherein the charging contact face is conical.

4. The contact-making apparatus of claim 1, wherein the charging contact face is fit to the charging apparatus for oscillating movement.

5. The contact-making apparatus of claim 1, wherein the motor vehicle contact face is fit to a lower side of the motor vehicle and the charging contact face is fit to an upper side of the charging apparatus.

6. The contact-making apparatus of claim 1, wherein the charging apparatus is connected to a fixed power supply system.

7. An electric vehicle or a hybrid vehicle, comprising a motor vehicle contact element that is connectable to a charging contact element with a contact-making apparatus of claim 1.

8. A method for charging an electrical energy storage device of a motor vehicle comprising:
    providing at least one motor vehicle contact element associated with the motor vehicle, the motor vehicle contact element having a motor vehicle contact face;
    positioning the motor vehicle contact element in proximity to at least one charging contact element associated with a charging apparatus, the charging contact element having a charging contact face configured for surface-to-surface contact with the motor vehicle contact face on the motor vehicle contact element;
    moving the charging contact element toward the motor vehicle contact element so that the charging contact face achieves surface-to surface contact with the motor vehicle contact face; and rotating the charging contact element relative to the motor vehicle contact element so that the charging contact face and the motor vehicle contact face clean one another.

9. The method of claim 8, wherein the step of rotating the charging contact element comprises rotating the charging contact element about a rotational axis substantially normal to a moving direction of the charging contact element toward the motor vehicle contact element.

\* \* \* \* \*